United States Patent
Chou et al.

(10) Patent No.: US 8,192,774 B2
(45) Date of Patent: Jun. 5, 2012

(54) OIL EXTRACTION

(75) Inventors: Chih-Chung Chou, Taoyuan County (TW); Kohsin Chien, Yangmei Township, Taoyuan County (TW)

(73) Assignee: Oilseeds Biorefinery Corporation, George Town, Grand Cayman (KY)

( * ) Notice: Subject to any disclaimer, the term of this patent is extended or adjusted under 35 U.S.C. 154(b) by 1131 days.

(21) Appl. No.: 11/375,675

(22) Filed: Mar. 14, 2006

(65) Prior Publication Data

US 2007/0218175 A1 Sep. 20, 2007

(51) Int. Cl.
*C11B 1/10* (2006.01)

(52) U.S. Cl. ........ 426/417; 426/531; 426/426; 426/428; 554/8; 554/9

(58) Field of Classification Search ............. 554/8, 9; 426/531, 417

See application file for complete search history.

(56) References Cited

U.S. PATENT DOCUMENTS

| 4,004,041 A | 1/1977 | Koslowsky | |
|---|---|---|---|
| 6,284,720 B1 * | 9/2001 | Opre | 510/170 |
| 6,649,579 B2 * | 11/2003 | Denton | 510/138 |

FOREIGN PATENT DOCUMENTS

| EP | 1 491 204 A1 | 12/2004 |
|---|---|---|
| WO | WO 2005/039727 A1 | 5/2005 |

OTHER PUBLICATIONS

Opre, J. 2000. Vertec Biosolvents Press Release! Agrochemical Based Biodegradable Solvent Performance Ethyl Lactate & Soy Methyl Ester. presented Jun. 8, 2000. Las Vegas Convention Center.*
Liu et al., "Quality Comparison of Rice Bran Oil Extracted with d-Limonene and Hexane", Cereal Chem. 82(2):209-215, 2004.
Mani et al., "Solvent Extraction of Oil from *Moringa* (*Moringa oleifera*) Seed Kernals", ASAE/CSAE Meeting Presenttion Paper No. 046057, 2004.
Kwiatkowski et al., "Ethanol extraction of oil from dry-milled corn: process optimization and rheological properties of the extract" ASAE/CSAE Meeting Presenttion Paper No. 026144, 2002.
Miller et al., "Optimizing the Oil Extraction/Water Adsorption Step in Sequential Extraction Processing of Corn", Transactions of the ASAE, 45(1):137-144, 2002.
Dunford et al, "Pressurized solvent extraction of wheat germ oil", Food Researc International 36:905-909, 2003.
Johnson et al., "Theoretical, Comparative, and Historical Analyses of Alternative Technologies for Oilseeds Extraction", Analysis of Alternative Extraction Technologies, pp. 4-47, 1995.

* cited by examiner

*Primary Examiner* — Carolyn Paden

(74) *Attorney, Agent, or Firm* — Thomas, Kayden, Horstemeyer & Risley, LLP

(57) ABSTRACT

This invention features a method of producing a triglyceride solution. The method includes contacting a liquid fatty acid alkyl ester and a substance containing triglyceride so that the triglyceride is dissolved into the fatty acid alkyl ester to form a triglyceride solution.

29 Claims, No Drawings

OIL EXTRACTION

BACKGROUND

Oil has been routinely recovered from oil-bearing plants for thousands of years. A large variety of plants produce sufficient quantities of oil that can be processed into edible or industrial products.

Oil from oil-bearing plants is typically extracted by solvents. Solvent extraction is a mass-transfer process in which one or more materials are transported from a mixture to a solvent phase, resulting in their separation from the mixture. Various organic solvents have been used for commercial extraction. However, there still exists a need in developing a cost-effective solvent and environment-friendly extraction process for recovering oil from oil-bearing plants.

SUMMARY

This invention is based on the discovery that a triglyceride can be readily extracted from an oil-bearing seed by using a fatty acid alkyl ester as a solvent.

In one aspect, this invention features a method of producing a triglyceride solution. The method includes contacting a liquid fatty acid alkyl ester and a substance containing triglyceride (e.g., at 15-180° C. or 25-150° C.) so that the triglyceride is dissolved into the fatty acid alkyl ester to form a triglyceride solution. Preferably, the fatty acid alkyl ester is obtained, prior to the contacting step, by reacting alcohol (e.g. a C1-C8 primary or secondary alcohol) with triglyceride extracted from the same triglyceride-containing substance. Exemplary alcohols include methanol, ethanol, n-propanol, isopropanol, n-butanol, isobutanol, n-pentanol, isopentanol, neopentanol and n-hexanol. The fatty acid alkyl ester and the triglyceride-containing substance can be mixed at a weight ratio ranging from 1:2 to 10:1 (e.g., from 1:1 to 6:1).

The triglyceride-containing substance can be oil-bearing seed. The term "oil-bearing seed" refers to any plant seed suitable for oil extraction. Examples of oil-bearing seed include, but are not limited to, soybean, peanut, sunflower seed, rapeseed, corn (e.g., corn germs or distillers dried corn grains), jatropha seed, karanja seed, neem seed, mahua seed, castor bean, rubber seed, cotton seed, palm kernel, olive, almond kernel, babassu seed, ben seed, cardoon seed, camelina seed, linseed, hazelnut kernel, hemp seed, mustard seed (e.g., Ethiopian mustard seed and Indian mustard seed), jojoba seed, poppy seed, safflower seed, sesame seed, wheat grain, sal seed, crambe seed, cuphea seed, nahor seed, and tobacco seed. Alternatively, the triglyceride-containing substance can be obtained from parts other than seed in certain oil-bearing plants. The term "oil-bearing plant" refers to any plant that contains oil in any part (e.g., seed or fruit) and is suitable for oil extraction. Examples in addition to those listed above include, but are not limited to, rice bran, palm (e.g., palm fruit pulp), yellowwood, and algae.

The fatty acid alkyl ester described above can contain a C1-C8 primary or secondary alkoxy moiety or a C6-C24 fatty acid moiety. The term "alkoxy" refers to a straight or branched, saturated or unsaturated, non-aromatic hydrocarbon moiety containing an oxygen radical, such as —$OCH_3$ or —$OCH=C_2H_4$. The term "fatty acid" mentioned herein refers to a straight or branched, saturated or unsaturated monobasic organic acid. Exemplary fatty acids include, but are not limited to, caproic acid, caprylic acid, capric acid, lauric acid, myristic acid, palmitic acid, margaric acid, stearic acid, nonadecanoic acid, arachidic acid, behenic acid, lignoceric acid, palmitoleic acid, oleic acid, linoleic acid, linolenic acid, cis-11-eicosenoic acid, and erucic acid. Exemplary fatty acid alkyl esters include, but are not limited to, fatty acid methyl esters, fatty acid ethyl esters, fatty acid n-propyl esters, fatty acid isopropyl esters, fatty acid n-butyl esters, fatty acid isobutyl esters, fatty acid n-pentyl esters, fatty acid isopentyl esters, fatty acid neopentyl esters, and fatty acid n-hexyl esters. Typically, the fatty acid alkyl ester can have a boiling point of 150-500° C.

The details of one or more embodiments of the invention are set forth in the description below. Other features, objects, and advantages of the invention will be apparent from the description and from the claims.

DETAILED DESCRIPTION

This invention relates to extracting a triglyceride from an oil-bearing plant using a fatty acid alkyl ester as a solvent at a certain temperature (e.g., 15-180° C.) to obtain an extraction solution. When the oil-bearing plant contains a high oil content, the plant can be optionally pressed or squeezed to remove a portion of the oil before extraction. If desired, the oil-bearing plant can also be pulverized to facilitate extraction.

The extraction process can be performed by methods well known in the art. As an example, it can be carried out by mixing a pulverized oil-bearing plant and a fatty acid alkyl ester in a continuous stirred-tank reactor for a predetermined period of time. As another example, it can be carried out continuously by bring together, without mixing, a pulverized oil-bearing plant and a fatty acid alkyl ester in a plug flow reactor or a fixed bed reactor through a counter-current flow, a co-current flow, or a combination of both flows. The extraction process can be carried out by either a batch method or a flow method. Typically, a flow method can be used to help maintain reasonable manufacturing costs.

The extraction can be performed at different temperatures. Generally, extraction at a higher temperature (e.g., above 35° C.) recovers more oil. However, high temperature extraction may also produce more impurities (e.g., phosphorus and moisture). The weight ratio between the solvent and the oil-bearing plant used in the extraction process depends on various factors, e.g., the type of the oil-bearing plant and the oil content in the oil-bearing plant. For example, one can use a low weight ratio for extracting a prepressed oil-bearing plant, from which a portion of the oil in the plant has been removed. Typically, the weight ratio is in the range of 1:2 to 10:1. Other extraction conditions (e.g., the extraction time) can be determined empirically.

The fatty acid alkyl ester used in the extraction process can be prepared by known methods. For example, a fatty acid alkyl ester can be prepared by an esterification reaction between an alcohol (e.g., ethanol) and a fatty acid (e.g., stearic acid). As another example, a fatty acid alkyl ester can be prepared by a transeterification reaction between an alcohol and a triglyceride, such as the transeterification reactions described in U.S. patent application Ser. No. 10/945,339. Preferably, the fatty acid alkyl ester is prepared from a C1-C4 alcohol. Extractions with such a fatty acid alkyl ester generally produce a triglyceride solution that contains less impurities (e.g., phosphorus and moisture). The triglyceride used to prepare the fatty acid alkyl ester can be obtained from a plant different from the plant to be extracted. Preferably, the triglyceride is obtained from a plant that is the same as the plant to be extracted. In that case, the triglyceride extracted from the plant is identical to the triglyceride used to prepare the extraction solvent (i.e., the fatty acid alkyl ester). As a result, if the extracted triglyceride is subsequently used to prepare the fatty acid alkyl ester via a transesterification reaction, the fatty acid alkyl ester in an extraction solution can be used as a solvent for the reaction and therefore needs not to be separated from the extracted triglyceride.

After the extraction process, the fatty acid alkyl ester can be optionally separated from the extracted triglyceride by partially or completely removal from an extraction solution. The removal step can be carried out by distillation using a vacuum column, a short-path vacuum distillation unit, or any other suitable device known in the art. Whether to remove the fatty acid alkyl ester partially or completely from an extraction solution or to remove it at all depends on various factors, such as the ratio between the fatty acid alkyl ester and the extracted triglyceride and the end use of the extracted triglyceride.

The extracted triglyceride can be further processed for use in the food and pharmaceutical industries. It can also be used as a raw material for preparing fatty acid alkyl esters or fatty alcohols. Fatty acid alkyl esters are useful as diesel fuels, lubricant oils, or chemical intermediates. Fatty alcohols are useful as surfactants in detergent industry.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All of the publications cited herein, including patents, are hereby incorporated by reference in their entirety.

EXAMPLE 1

Soybeans were first ground into a powder and sieved through a filter having a size of 40 mesh (about 425-520 μm). Soybean powder having an average particle size of less than 40 mesh, which is similar to a dehulled powder, was collected and used for oil extraction.

The soybean powder obtained above was dried until it had a moisture content of less than 6 wt %. The powder was then extracted using soybean based fatty acid methyl esters (FAMEs) as a solvent in a beaker with agitation. The soybean based FAMEs were previously prepared by a transesterification reaction between methanol and triglycerides obtained from soybean.

The extraction process was carried out by using FAMEs at a solvent-to-powder weight ratio of 6:1 at 35° C. The beaker was agitated at a revolution per minute (rpm) of 300. After 30 minutes of extraction, the content of the miscella (i.e., the solution containing extracted oil) was determined. The oil content in the miscella was determined by HPLC (JASCO model 1580; column: Luna Su C18, 2 μm, 250*4.6 mm, Phenomenex, Torrance, Calif.; mobile phases: methanol, and hexane/isopropyl alcohol (4:5); UV detector: UV-2075, JASCO Inc., Tokyo, Japan). The moisture content in the miscella was determined by the Karl-Fisher method according to the operation manual, MKC-500 KF Moisture Titrator Kyoto Electronic Manufacturing Co. Ltd, Ver. 04, #595-0006. The phosphorus content in the miscella was determined according to American Oil Chemist's Society official method Ca 12-55. The results showed that miscella contained a moisture content of 818 ppm, a phosphorus content of 14.4 ppm, and an oil content of 3.60 wt %. The weight of the extracted oil was 20% of that of the soybean powder.

The soybean powder was also successively extracted with FAMEs at a reduced solvent-to-powder ratio in a beaker. Specifically, the powder was extracted twice at a solvent-to-powder ratio of 1:1 by agitating the beaker at a rpm of 1,000 for 15 minutes. After the first extraction, the miscella contained a moisture content of 989 ppm, a phosphorus content of 23.4 ppm, and an oil content of 14.08 wt %. After the second extraction, the miscella contained a moisture content of 1,428.3 ppm, a phosphorus content of 14.23 ppm, and an oil content of 6.13 wt %. After two extractions, the total weight of the extracted oil was 21.59% of that of the soybean powder.

Finally, the soybean powder obtained above was also extracted via a conventional method. Specifically, the powder was extracted by Gerhardt's Soxtherm automated soxlet system using hexane as a solvent at a solvent-to-powder ratio of 8:1 at 65° C. This method is described in Official and Tentative Methods, the American Oil Chemist Society, Vol. 1, AOCS Champaign 11 (1980) Method Am 2-93. The results show that the oil contained a phosphorus content of 265 ppm. The weight of the extracted oil was 18.8% of that of the soybean powder.

EXAMPLE 2

Two types of oil-bearing seeds were extracted by FAMEs prepared from triglycerides obtained from their corresponding oil sources. Specifically, sunflower seeds were extracted by sunflower seed based FAMEs and peanuts (ground nuts) were extracted by peanut based FAMEs.

Sunflower seeds were dehulled and ground into a powder having an average particle size of less than 40 mesh. The powder was dried until it had a moisture content of less than 6 wt %. It was then extracted twice in a beaker with sunflower seed based FAME at a solvent-to-powder ratio of 1:1. Each extraction was conducted by agitating the beaker at a rpm of 1,000 for 15 minutes at 35° C. After the first and second extractions, the miscella contained a moisture content of 794 and 831 ppm, respectively, a phosphorus content of 49.6 and 47.8 ppm, respectively, and an oil content of 35.65 and 12.30 wt %, respectively. After two extractions, the total weight of the extracted oil was 54.83% of that of the sunflower seeds.

Peanuts were ground into a powder having an average particle size of less than 25 mesh (i.e., about 425-710 μm) and then dried until it contained less than 6 wt % of moisture. The powder was then extracted four times in a beaker with peanut based FAMEs at a solvent-to-powder ratio of 1:1. Each extraction was conducted by agitating the beaker at a rpm of 1,000 for 15 minutes at 35° C. After the first, second, third, and fourth extractions, the miscella contained a moisture content of 701, 690, 661, and 661 ppm, respectively, a phosphorus content of 23.5, 16.4, 0, and 0 ppm, respectively, and an oil content of 31.4, 10.9, 2.63, and 0.78 wt %, respectively. After three extractions, the total weight of the extracted oil was 45.83% of that of the peanuts. After four extractions, the total weight of the extracted oil was 47.48% of that of the peanuts.

EXAMPLE 3

Soybeans were extracted by soybean based fatty acid ethyl esters (FAEEs). Soybean based FAEEs were prepared by a transesterification reaction between ethanol and triglycerides obtained from soybeans.

Soybeans were first ground into a powder having an average particle size of less than 40 mesh and then dried until it had a moisture content of less than 6 wt %. The powder was then extracted three times in a beaker with soybean based FAEEs at a solvent-to-powder ratio of 1:1. Each extraction was conducted by agitating the beaker at a rpm of 1000 for 15 minutes at 35° C. After the first, second, and third extractions, the miscella contained a moisture content of 650, 652, and 694 ppm, respectively, a phosphorus content of 39.4, 23.3, 16.0 ppm, respectively, and an oil content of 14.09, 5.93, and 1.05 wt %, respectively. After three extractions, the total weight of the extracted oil was 20.1% of that of the soybean powder.

EXAMPLE 4

Soybeans were extracted by a method similar to that described in Example 3 except that soybean based fatty acid butyl esters (FABEs) were used as a solvent. Soybean based FABEs were prepared by a transesterification reaction between n-butanol and triglycerides obtained from soybeans.

After the first, second, and third extractions, the miscella contained a moisture content of 576, 519, and 479 ppm, respectively, a phosphorus content of 27.32, 13.49, and 0.96 ppm, respectively, and an oil content of 15.93, 5.10, and 1.60 wt %, respectively. After three extractions, the total weight of the extracted oil was 21.6% of that of the soybean powder.

EXAMPLE 5

Soybeans were extracted by a method similar to that described in Example 4 except that the extractions were conducted at a reduced agitation rate, i.e., at a rpm of 500. Further, the extractions were conducted at four different temperatures, i.e., 35° C., 60° C., 100° C., and 150° C.

The results show that the total weight of the extracted oil increased at higher temperatures. Specifically, at 35° C., 60° C., 100° C., and 150° C., the total weights of the extracted oil were respectively 21.42, 23.25, 28.4, and 32.8% of those of soybean powder. The results also show that at 35° C., 60° C., 100° C., and 150° C., the phosphorus contents in a mixture containing a combination of miscella obtained after each extraction were 16.2, 18.64, 48.32, and 91.12 ppm, respectively.

EXAMPLE 6

Two oil-bearing seeds were extracted by FAMEs prepared from triglycerides obtained from their corresponding oil sources and triglycerides obtained from another oil source. Specifically, sunflower seeds were extracted by sunflower seed based FAMEs and soybean based FAMEs, and peanuts (ground nuts) were extracted by peanut based FAMEs and soybean based FAMEs.

Sunflower seeds were extracted with sunflower seed based FAMEs and soybean based FAMEs using a method similar to that described in Example 2 except that a solvent-to-powder ratio of 6:1 was used and that only one extraction was performed. After the extraction with sunflower seed based FAMEs and soybean based FAMEs, the miscella contained a moisture content of 466 and 856 ppm, respectively, a phosphorus content of 10.6 and 12.78 ppm, respectively, and an oil content of 6.33 and 4.06 wt %, respectively. The total weight of the extracted oil was 39.0% of that of the sunflower seeds when sunflower seed based FAMEs were used as the solvent and 24.71% of that of the sunflower seeds when soybean based FAMEs were used as the solvent.

Peanuts were extracted with peanut based FAMEs and soybean based FAMEs using a method similar to that described in Example 2 except that the solvent-to-powder ratio was 6:1 and that only one extraction was performed. After the extraction with peanut seed based FAMEs and soybean based FAMEs, the miscella contained a moisture content of 470 and 718 ppm, respectively, a phosphorus content of 19.36 and 10.0 ppm, respectively, and an oil content of 6.23 and 6.83 wt %, respectively. The total weight of the extracted oil was 39.1% of that of the peanuts when peanut based FAMEs were used as the solvent and 39.8% of that of the peanuts when soybean based FAMEs were used as the solvent.

The above results show that oil could be extracted from a plant seed using FAMEs prepared from oil of the same plant seed and FAMEs prepared from oil of a different plant seed.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the scope of the following claims.

What is claimed is:

1. A method of extracting triglyceride from an oil-bearing plant, comprising contacting a part of an oil-bearing plant containing a triglyceride with a liquid fatty acid alkyl ester, said ester being obtained by reacting alcohol with a triglyceride that is identical to the triglyceride extracted from the triglyceride-containing part of the oil-bearing plant, whereby the triglyceride is dissolved into the fatty acid alkyl ester to form a triglyceride solution.

2. The method of claim 1, wherein the oil-bearing plant is rice bran, palm fruit pulp, yellowwood, or algae.

3. The method of claim 1, wherein the part of the oil-bearing plant is oil-bearing seed.

4. The method of claim 3, wherein the oil-bearing seed is soybean, peanut, sunflower seed, rapeseed, corn, jatropha seed, karanja seed, neem seed, mahua seed, castor bean, rubber seed, cotton seed, palm kernel, olive, almond kernel, babassu seed, ben seed, cardoon seed, camelina seed, linseed, hazelnut kernel, hemp seed, mustard seed, jojoba seed, poppy seed, safflower seed, sesame seed, wheat grain, sal seed, crambe seed, cuphea seed, nahor seed, or tobacco seed.

5. The method of claim 1, wherein the fatty acid alkyl ester contains a C6-C24 fatty acid moiety.

6. The method of claim 1, wherein the fatty acid alkyl ester contains a C1-C8 primary or secondary alkoxy moiety.

7. The method of claim 1, wherein the fatty acid alkyl ester is a fatty acid methyl ester, a fatty acid ethyl ester, a fatty acid n-propyl ester, a fatty acid isopropyl ester, a fatty acid n-butyl ester, a fatty acid isobutyl ester, a fatty acid n-pentyl ester, a fatty acid isopentyl ester, a fatty acid neopentyl ester, or a fatty acid n-hexyl ester.

8. The method of claim 1, wherein the fatty acid alkyl ester has a boiling point of 150-500° C.

9. The method of claim 1, wherein the contacting step is conducted at 15-180° C.

10. The method of claim 9, wherein the contacting step is conducted at 25-150° C.

11. The method of claim 1, wherein the fatty acid alkyl ester and the part of the oil-bearing plant are contacted at a weight ratio ranging from 1:2 to 10:1.

12. The method of claim 1, wherein the fatty acid alkyl ester is obtained, prior to the contacting step, by reacting alcohol with triglyceride extracted from the same part of the oil-bearing plant.

13. The method of claim 12, wherein the oil-bearing plant is rice bran, palm fruit pulp, yellowwood, or algae.

14. The method of claim 12, wherein the part of the oil-bearing plant is oil-bearing seed.

15. The method of claim 14, wherein the oil-bearing seed is soybean, peanut, sunflower seed, rapeseed, corn, jatropha seed, karanja seed, neem seed, mahua seed, castor bean, rubber seed, cotton seed, palm kernel, olive, almond kernel, babassu seed, ben seed, cardoon seed, camelina seed, linseed, hazelnut kernel, hemp seed, mustard seed, jojoba seed, poppy seed, safflower seed, sesame seed, wheat grain, sal seed, crambe seed, cuphea seed, nahor seed, or tobacco seed.

16. The method of claim 15, wherein the fatty acid alkyl ester contains a C6-C24 fatty acid moiety.

17. The method of claim 16, wherein the alcohol is a C10-C8 primary or secondary alcohol.

18. The method of claim 17, wherein the fatty acid alkyl ester is a fatty acid methyl ester, a fatty acid ethyl ester, a fatty acid n-propyl ester, a fatty acid isopropyl ester, a fatty acid n-butyl ester, a fatty acid isobutyl ester, a fatty acid n-pentyl ester, a fatty acid isopentyl ester, a fatty acid neopentyl ester, or a fatty acid n-hexyl ester.

19. The method of claim 18, wherein the fatty acid alkyl ester and the part of the oil-bearing plant are contacted at a weight ratio ranging from 1:2 to 10:1.

20. The method of claim 19, wherein the contacting step is conducted at 15-180° C.

21. The method of claim 20, wherein the contacting step is conducted at 25-150° C.

22. The method of claim 12, wherein the fatty acid alkyl ester contains a C6-C24 fatty acid moiety.

23. The method of claim 12, wherein the alcohol is a C10-C8 primary or secondary alcohol.

24. The method of claim 12, wherein the fatty acid alkyl ester is a fatty acid methyl ester, a fatty acid ethyl ester, a fatty acid n-propyl ester, a fatty acid isopropyl ester, a fatty acid n-butyl ester, a fatty acid isobutyl ester, a fatty acid n-pentyl ester, a fatty acid isopentyl ester, a fatty acid neopentyl ester, or a fatty acid n-hexyl ester.

25. The method of claim 12, wherein the fatty acid alkyl ester has a boiling point of 150-500° C.

26. The method of claim 12, wherein the contacting step is conducted at 15-180° C.

27. The method of claim 26, wherein the contacting step is conducted at 25-150° C.

28. The method of claim 12, wherein the fatty acid alkyl ester and the part of the oil-bearing plant are contacted at a weight ratio ranging from 1:2 to 10:1.

29. The method of claim 1, wherein the alcohol is a C10-C8 primary or secondary alcohol.

* * * * *

UNITED STATES PATENT AND TRADEMARK OFFICE
CERTIFICATE OF CORRECTION

| | | |
|---|---|---|
| PATENT NO. | : 8,192,774 B2 | Page 1 of 1 |
| APPLICATION NO. | : 11/375675 | |
| DATED | : June 5, 2012 | |
| INVENTOR(S) | : Chou et al. | |

It is certified that error appears in the above-identified patent and that said Letters Patent is hereby corrected as shown below:

Col. 7, line 17 should read "a C1-C8 primary or secondary alcohol."

Col. 8, line 8 should read "a C1-C8 primary or secondary alcohol."

Col. 8, line 24 should read "a C1-C8 primary or secondary alcohol."

Signed and Sealed this
Twenty-fourth Day of July, 2012

David J. Kappos
*Director of the United States Patent and Trademark Office*